April 25, 1944.   K. RUDOLPH   2,347,614
METHOD OF MAKING HOLLOW GLASS BODIES
Filed March 14, 1941
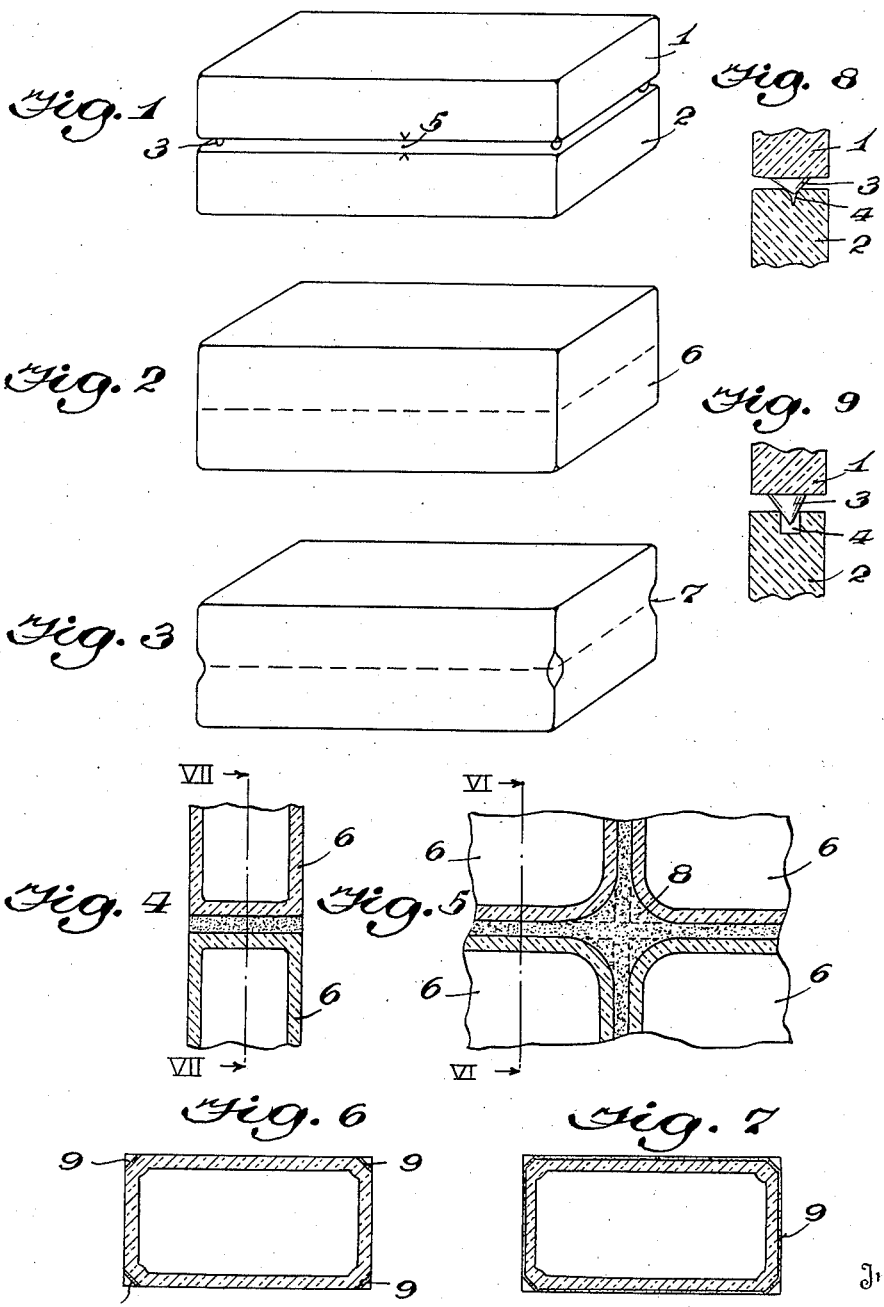
Inventor
Karl Rudolph,
By Alex Holcombe
Attorney.

Patented Apr. 25, 1944

2,347,614

UNITED STATES PATENT OFFICE 2,347,614

METHOD OF MAKING HOLLOW GLASS BODIES

Karl Rudolph, Dresden, Germany; vested in the Alien Property Custodian

Application March 14, 1941, Serial No. 383,370
In Germany March 1, 1940

4 Claims. (Cl. 49—82)

This invention relates to a method of making hollow glass bodies, more especially glass building blocks or bricks. Such blocks hitherto have been produced from separate halves which were first brought into suitable relative position, then heated by gas flames at their corresponding edges and finally pressed together. However the holding and conveying devices developed for this purpose were rather complicated and yet did not effect an exact coincidence of the conjugate parts and a perfect fusion of the engaging edges.

The object of the present invention is to provide a method by which blocks of the kind described may be fused together quite uniformly, avoiding the formation of inner tensions or opaque or metallic passages and this without the necessity of employing complicated mechanical devices. Thus simultaneously a new surface configuration is obtained effecting the best cohesion of the blocks in the bond, practically no light being absorbed. According to this method both halves are quite uniformly heated, as far as possible immediately after their production when they are still hot, so that no thermic tensions occur in the finished blocks. The fracture of the blocks at different points of the seam of fusion which hitherto often occurred and the penetration of air and moisture into the blocks are in this way avoided. Likewise the variations in strength of the blocks hitherto prevailing are avoided or at least greatly diminished.

According to the invention the two halves of the hollow glass bodies, especially building blocks, are first provided at their faces to be joined with recesses and corresponding projections, the latter being higher than the recesses are deep. Thereupon the halves of the block coinciding owing to the projections engaging the recesses, are placed above each other while still hot from their production, a gap of uniform width being left between the adjacent edges of the halves in accordance with the difference in height of the projections and the recesses. The surfaces to be united are then heated by fusing flames or hot gases introduced into the gap and extending into the inner hollow space, and finally the halves are pressed together, the projections and recesses being squeezed into one another. The recesses and the projections may be cone-shaped, the base of the projecting cones having preferably a greater diameter than the opening of the recesses.

Another feature of the invention consists in flattening down the hollow glass blocks, when fusing together the halves of the blocks, at their edges or in some cases at other points of the seam of fusion. Preferably the blocks still hot from the fusing operation are covered at the side faces to be masoned up with a material being a good reflector of light and reflecting part of the incident rays toward the interior of the blocks. This material may be rough by itself at its outside or it may be coated with a roughing material.

The blocks made according to the invention are therefore provided with projections and corresponding recesses arranged in the original halves of the blocks respectively. They are further distinguished by symmetrically arranged notches and finally show a layer applied to the side faces to be masoned and being a good reflector of light.

The invention is illustrated in the annexed drawing of which

Fig. 1 shows, in perspective view, two halves of a block arranged above each other;

Figs. 2 and 3 are perspective views showing two stages of the method of producing the new blocks;

Figs. 4 and 5 show cross-sections of the new glass blocks set in mortar;

Figs. 6 and 7 are longitudinal cross-sections of a single block, and

Figs. 8 and 9 show, on an enlarged scale, two modifications of the glass projections and recesses in cross-section.

The halves 1, 2 are provided, preferably at their corners, with projections 3 and corresponding recesses 4. The projections consist of glass having the same or a somewhat lower fusing point than the glass forming the material of the halves of the block. When the halves are formed by pressure, the projections and the recesses may be pressed on or in, respectively, from the same material. The projections are longer by the width of the gap 5 than the depth of the recesses.

As shown in Figs. 8 and 9 on an enlarged scale, the projections 3 may have a base greater than the opening of the recesses. The projections may be cone-shaped, whereas the recesses may have the form of a trumpet or the like. The recesses may also, as shown in Fig. 9, be of cylindrical or of approximately cylindrical form.

For manufacturing the new blocks the halves provided with projections or recesses as shown in Fig. 1 are placed one above the other and made to coincide by the projections engaging the recesses, i. e., they are brought into their correct relative position. During the fusing operation the flames pass from all sides through the gap 5 left between the projections 3, thereby heating the edges uniformly over their whole cross-sectional area. As soon as the desired degree of softening is reached, the two halves are compressed and thereby united to a unitary glass building block 6 (Fig. 2). As the heating can be maintained up to the last moment, and even during the compression, the formation of a tight joint over the whole cross-sectional area is absolutely assured.

In order to improve the uniting by fusion, especially near the projections and the recesses of the edges of the blocks, the seam at the four adjoining edges of the blocks is preferably squeezed down to a more or less extent by the operator when he smoothes the seams. Thus notches 7 are formed at the four shortest edges of the block, as shown in Fig. 3. These notches are placed in the middle of the edges to be laid in mortar and therefore afford the especial advantage of a plug of concrete 8 being formed at the point of junction of four blocks whereby the blocks are given an absolutely firm bond. Practical experiments have taught that the plug of concrete seated in these notches imparts to the glass building block much better stability than a normal brick has in the bond. The projections and recesses or the notches or both may be provided at points of the seam of fusion other than at the shortest edge of the blocks, but in any case they must be arranged symmetrically so as to coincide when cementing a plurality of blocks.

As the notches and therewith the plugs of concrete 8 extend only over a small portion of the surfaces of the blocks to be mortared, the permeability to light of the whole glass-wall is not considerably impaired by the arrangement of the notches. The slight diminution of the permeability to light effected by the notching may be compensated by coating the side faces, to be united by concrete, at the notches 7 with a layer 9 of a material reflecting light toward the interior of the blocks (see Figs. 6 and 7). The layer may consist of an extruded metal, as aluminum, or of an aluminum or silver varnish or the like. It may also extend beyond the notches 7 and cover the whole of the side faces to be united by concrete. For producing a color effect the layer 9 may be made of a material or a mixture of materials preferably reflecting light of the desired wave length. Such glass building blocks giving a color effect could not be produced hitherto, because the glass for making glass building blocks is withdrawn from continuously working melting-pots from which practically glass of only one unitary color can be withdrawn.

The outside of the reflecting layer may be rendered rough, or the reflecting layer may be coated with a roughing medium on its outside.

While the invention has been described in the present specification and shown in the drawing with reference to several modes of execution, I wish to emphasize that the invention is not limited to the modifications shown and described, but can be carried out in various ways without departing from the gist of the invention. In the foregoing specification I have by way of example indicated that the hollow glass building blocks are to be produced from two halves of glass building blocks. This does not mean that the two parts must be in any case of the same size. For instance, the side faces to be united by fusion may differ in height so that the seam of fusion of the finished block does not divide the side face into equal halves. Furthermore the symmetrically arranged notches 7 and the layer 9 may be applied not only to blocks of the kind described, but also to other hollow glass blocks. More especially, the notches may be provided not at the edges but at other points of the faces to be cemented. Furthermore the layer 9 may be arranged inside instead of outside the walls of the blocks to be cemented.

I claim:

1. The method of producing hollow bodies from fusible material which comprises forming hollow mating sections with matching edges having interengaging lugs and recesses shaped to cause accurate positioning of the sections in mating relation and to hold said sections in spaced relation, assembling the sections in mating spaced relation with the lugs engaged in the recesses, heating the surfaces to be united to the fusing temperature, and pressing the sections together to unite the fused surfaces.

2. The method of producing hollow glass bodies, especially building blocks, from two parts, comprising first providing one part with recesses spaced along its edge surface and the other part with projections along its edge surface spaced to register with said recesses, the projections being higher than the recesses are deep, then placing the parts one above the other with the recesses and projections coinciding, heating the surfaces to be united by flames striking through the resulting gap between the parts, and finally compressing the parts.

3. The method of producing hollow glass bodies, especially building blocks, comprising pressing two open halves and simultaneously pressing conical projections on the edge surface of one of the halves and corresponding recesses in the edge surface of the other of the halves, the projections being higher than the recesses are deep, then placing the halves one above the other with the recesses and projections coinciding, heating the surfaces to be united by flames striking through the resulting gap between the halves, and finally compressing the halves.

4. The method of producing hollow glass bodies, especially building blocks, comprising pressing two open halves and simultaneously pressing conical projections at the edge surface of one of the halves and corresponding recesses in the edge surface of the other of the halves, the projections being higher than the recesses are deep and their bases being greater than the openings of the recesses, then placing the halves one above the other with the recesses and projections coinciding, heating the surfaces to be united by flames striking through the resulting gap between the halves, and finally compressing the halves.

KARL RUDOLPH.